United States Patent Office 3,568,407
Patented Mar. 9, 1971

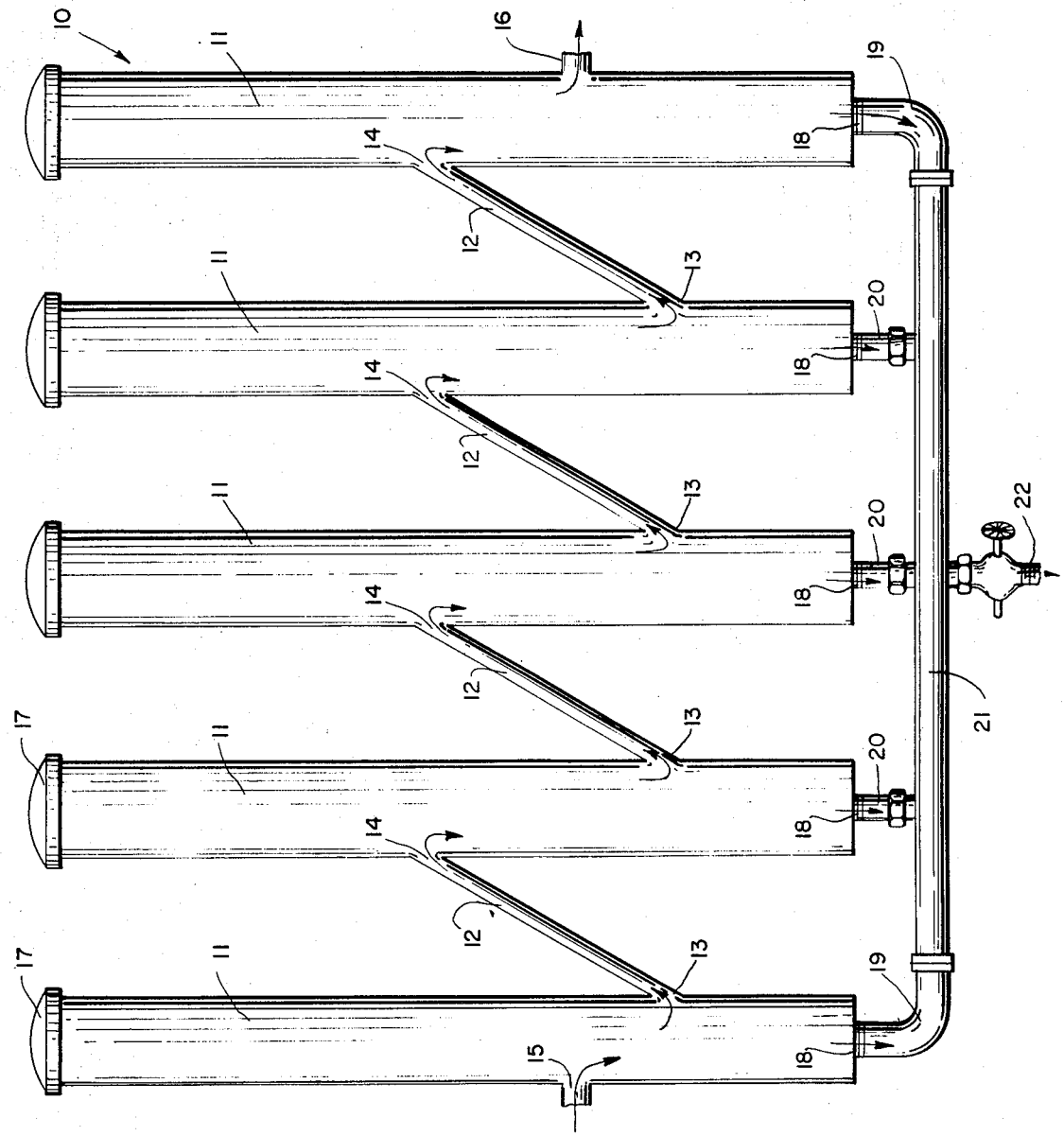

3,568,407
METHOD AND APPARATUS FOR SEPARATING LIQUID FROM GAS
Murray D. Bradley, Jr., Apt. D, 1668 La Vista Road, Atlanta, Ga. 30329
Filed July 23, 1969, Ser. No. 844,144
Int. Cl. B01d 51/06
U.S. Cl. 55—57   10 Claims

ABSTRACT OF THE DISCLOSURE

A method and apparatus for separating liquid such as moisture from a gas such as air. The air is passed through an enclosed passageway and is directed through a portion of reduced cross-section to reduce the pressure of the air by increasing its velocity in accordance with the Bernoulli principle, thereby reducing the moisture carrying capacity of the air. The liquid is then condensed and drained off.

BACKGROUND OF THE INVENTION

This invention relates to the separation of liquid from a carrier gas; and in particular it relates to a method and apparatus for eliminating excess moisture from compressed air.

Numerous industrial processes require the use of dry compressed air substantially free from excess moisture. This moisture is normally eliminated by passing the gas through headers or the like where temperature is reduced, thereby reducing the moisture carrying capacity of the air. However, many compressed air systems require a degree of dryness not economically obtainable by these previous means. Thus, there exists a need for a new and improved method for removing a liquid from a gas, and in particular for removing moisture from compressed air.

SUMMARY OF THE INVENTION

Thus, it is a purpose of this invention to provide a new and improved method and apparatus for separating liquid from a gas containing vapors of the same, and in particular it is a purpose of this invention to provide a new and improved method and apparatus for eliminating excess moisture from a compressed air system.

Briefly, in the present invention, excess water is eliminated by reducing the moisture carrying capacity of the air. This is accomplished in accordance with the following principles. First, the moisture carrying capacity of a gas can be reduced by decreasing the pressure of the gas. Further, in accordance with the Bernoulli effect, in a closed fluidic system such as flowing compressed air, a rapid increase in velocity, which results from a reduction in the cross-sectional flow area, causes a reduction in the pressure. More specifically, in accordance with the Bernouilli principle, in a system wherein $P_1$ and $V_1$ represent the pressure and velocity in the large cross-sectional flow area and $P_0$ and $V_0$ represent the pressure and velocity in a reduced cross-sectional flow area, where there is a rapid decrease in diameter from $P_1$, $V_1$ to $P_0$, $V_0$ and then an opposing increase to the original diameter, the pressure and velocity are as follows:

$$P_1 > P_0 \text{ and } V_1 < V_0$$

These principles are utilized in carrying out the preferred method and apparatus of the present invention by providing an arrangement wherein a plurality of vertical pipes are arranged side by side and interconnected along their lateral surfaces by connecting pipes of reduced cross-section. In operation the gas flows in series from the first vertical pipe through the first connecting pipe to the next vertical pipe and then into the next connecting pipe, et cetera until it reaches the last vertical pipe from which it flows through an outlet. In operation, the velocity of the gas will be increased, and hence the pressure decreased as the gas flows through the connecting pipes of reduced cross-section. Consequently, the excess moisture will condense out of the gas in these pipes.

In accordance with another main feature of the invention, means are provided for draining the collected condensed moisture. For this purpose, the connecting pipes are inclined, preferably upwardly in the direction of flow so that moisture which collects in the connecting pipes will flow back into the vertical pipe upstream from the same. Means are then provided at the bottom of the vertical pipe for collecting and draining the excess moisture.

Thus, a simplified and economical, but yet efficient method and apparatus is provided for drying the compressed air and conveniently separating and removing excess moisture.

Although the specific dimensions of the apparatus will depend upon particular operating conditions, in one preferred embodiment of the invention it has been found desirable to utilize vertical pipes six feet in length and four inches in diameter and small connecting pipes approximately two feet long and three-quarter inches in diameter, these latter pipes extending upwardly in the direction of flow at an angle of approximately sixty degrees. For facilitating condensation and yet eliminating corrosion, it has been found preferable to use galvanized steel pipes.

Thus, it is an object of this invention to provide a new and improved method and apparatus for separating a liquid from a gas containing vapors of the same.

It is a further object of this invention to provide a new and improved method and apparatus for eliminating excess moisture from compressed air.

It is another object of this invention to provide a new and improved method and apparatus utilizing the Bernoulli effect for reducing the pressure, and hence the moisture carrying capacity of a gas.

It is another object of this invention to provide a new and improved method and apparatus including a series arrangement of large vertical and small interconnecting pipes for condensing moisture and collecting the same for drainage from the system.

Other objects and the attendant advantages of the present invention will become apparent from the detailed description to follow, together with the accompanying drawing.

BRIEF DESCRIPTION OF THE DRAWING

The single drawing accompanying this application illustrates an apparatus of the invention and which apparatus can be used to carry out the method of the invention.

DETAILED DESCRIPTION OF THE PREFERRED EMBODIMENTS

Referring now to the drawing, the separating apparatus referred to generally as 10 includes a plurality of vertically extending large pipes 11, interconnected by small connecting pipes 12. These pipes 12 extend from an opening 13 at the lower part of one vertical pipe 11 upwardly at an angle of approximately 60° to an opening 14 in the next large pipe 11. Air enters the system at inlet 15 and flows in the direction as indicated by the arrows, in series from the first pipe 11 downwardly to the opening 13 and then upwardly through the first pipe 12 to the opening 14 and then downwardly through the second pipe 11 to the next opening 13, and so on, in series until the air reaches the last vertical pipe 11 from which it flows outwardly through outlet opening 16. To ensure that the path is closed from 15 to 16 through pipes 11 and 12, the upper ends of pipes 11 are closed by suitable caps 17 and the lower ends of pipes 11 are closed except for openings 18.

For draining collected condensed liquid from the apparatus, openings 18 are provided at the bottoms of each pipe 11. From these openings, the collected liquid passes through either the elbow pipes 19 (for the end pipes 11) or the connecting pipes 20 to a manifold pipe 21 from which the liquid is periodically drained through an outlet valve 22.

All of the pipes shown in the drawing accompanying this application may be assumed to be circular in cross-section. However, the pipes can be of any other cross-section if desirable.

Although specific materials and specific dimensions are not critical and are dictated only by specific operating conditions, in a preferred arrangement of the invention, the various pipes are made of galvanized steel. Further, this preferred arrangement includes five vertical pipes 11, each six feet in length and four inches in diameter, and two foot long connecting pipes, three inches in diameter and extending upwardly from point 13 to point 14 at an angle of approvimately sixty degree.

The aparatus is operated as follows for carrying out the method of the invention. Compressed air, which has been compressed in a conventional compressor unit wherein the air has been heated (as a result of sudden pressurization) and which thus contains excess moisture, is introduced into the system at inlet opening 15. From here the compressed air flows downwardly from opening 15 to the first opening 13. The compressed air now passes upwardly through the reduced diameter pipe 12 from opening 13 to the opening 14. Since the diameter, and hence the cross-sectional area of pipe 12 is reduced, the velocity of the gas flowing through pipe 12 is increased. Consequently, in accordance with the Bernoulli principle, the pressure of the gas is reduced. Consequently, the moisture carrying capacity of the gas is reduced in pipe 12 and assuming that the gas has been near its saturation point and assuming that there is no significant increase in the temperature of the gas in pipe 12, moisture will condense and form as droplets along the wall of pipe 12. The gas, less this moisture, will then flow through the opening 14 into the second large pipe 11. Meanwhile, the collected moisture will flow down the pipe 12, that is upstream relative to the direction of flow of the gas, into the first pipe 11 and downwardly through the first opening 18 and the left elbow pipe 19 to the manifold pipe 21. The liquid will be periodically drained from the pipe 21 through valve 22. This process is repeated as the gas flows through subsequent pipes 11 and 12.

Secondary condensation will occur as a result of thermal emission through the pipes. Of course it is also assumed that the temperature of the air from the compressor will be less than the boiling point of water, 100° centigrade.

Alhough the invention has been described with considerable detail with respect to a preferred embodiment thereof, it will be apparent that the invention is capable of numerous modifications and variations apparent to those skilled in the art without departing from the spirit and scope of the invention.

I claim:
1. Apparatus for separating liquid from a gas comprising, means for directing a gas containing vapors of a liquid through an enclosed passageway from an inlet to an outlet, said passageway having first portions having a certain cross-sectional area between said inlet and outlet, and said passageway having at least one second portion in series with said first portions and of a cross-sectional area substantially less than that of the first portions, such that the velocity of gas flow through the second portions is greater than through the first portions, said second portions being inclined relative to a horizontal reference surface, and including drainage means for draining liquid collected in said second portion from said passageway.

2. Apparatus according to claim 1, wherein said first portions comprise at least two first vertical pipes of constant cross-section, and wherein the second portion comprises a second pipe connected to two vertical pipes for placing the said vertical pipes into fluid communication with each other and inclined upwardly from one of said vertical pipes to the other.

3. An apparatus according to claim 2, wherein the said second pipe is inclined to the horizontal at an angle of approximately 60°.

4. An apparatus according to claim 3, wherein the vertical pipes are approximately six feet in length and four inches in diameter and wherein the second pipes are approximately two feet in length and three-fourth inches in diameter.

5. An apparatus according to claim 2, wherein the vertical pipes include a drainage opening at their lower end such that liquid collected in the second pipe runs down the second pipe into the vertical pipe to which the second pipe is attached at its lower end, and then into such drainage opening.

6. An apparatus according to claim 5, wherein the apparatus includes at least three first pipes of galvanized steel and mounted side by side, and including a manifold drainage pipe connected to the said drainage openings of all said pipes and including a main liquid outlet from said manifold pipe.

7. A method for separating liquid from a pressurized gas containing vapors of said liquid, comprising the steps of: (a) passing said gas through an enclosed passageway from an inlet end to an outlet end, (b) reducing the pressure of the gas at certain portions in said passageway between said inlet and outlet by increasing the velocity of the gas at said portions, thereby reducing the moisture carrying capacity of said gas, the pressure reduction being great enough to cause liquid to condense out of said gas, and (c) draining said collected liquid out of the passageway.

8. The method of claim 7 wherein the gas is air and the liquid separated from the gas is water.

9. A method according to claim 7 wherein the gas is passed vertically downwardly through the passageway through pipes of certain cross-section when the pressure of the gas is not reduced, and then upwardly through pipes of reduced cross-section to reduce the pressure of the gas by increasing its velocity.

10. The method of claim 8, wherein the water runs down the second pipe and down the first pipe by gravity and is drained at the bottom of the first pipes from the apparatus.

References Cited
UNITED STATES PATENTS

| 2,015,288 | 9/1935 | Rosen | 55—342X |
| 2,302,262 | 11/1942 | Schiller | 55—342X |

SAMIH N. ZAHARNA, Primary Examiner

R. W. BURKS, Assistant Examiner

U.S. Cl. X.R.

55—342